(12) United States Patent
Bebenroth

(10) Patent No.: US 12,546,282 B2
(45) Date of Patent: Feb. 10, 2026

(54) HYDROMECHANICAL ENERGY STORAGE AND ENERGY CONVERSION DEVICE, AND OPERATING METHOD

(71) Applicants: Guenther Bebenroth, Berlin (DE); Bjoern Franke, Berlin (DE)

(72) Inventor: Guenther Bebenroth, Berlin (DE)

(73) Assignees: Guenther Bebenroth, Berlin (DE); Bjoern Franke, Berlin (DE)

( * ) Notice: Subject to any disclaimer, the term of this patent is extended or adjusted under 35 U.S.C. 154(b) by 0 days.

(21) Appl. No.: 18/272,596

(22) PCT Filed: Dec. 20, 2021

(86) PCT No.: PCT/EP2021/086727
§ 371 (c)(1),
(2) Date: Jul. 17, 2023

(87) PCT Pub. No.: WO2022/152513
PCT Pub. Date: Jul. 21, 2022

(65) Prior Publication Data
US 2024/0077054 A1    Mar. 7, 2024

(30) Foreign Application Priority Data
Jan. 18, 2021   (DE) ................. 10 2021 100 873.5

(51) Int. Cl.
*F03B 17/02* (2006.01)
*F03B 13/06* (2006.01)
*F03G 3/00* (2006.01)

(52) U.S. Cl.
CPC ............ *F03B 17/025* (2013.01); *F03B 13/06* (2013.01); *F03G 3/094* (2021.08); *F05B 2260/42* (2013.01)

(58) Field of Classification Search
CPC ....... Y02E 10/20; Y02E 10/30; F03B 17/025; F03B 13/06; F03B 17/02; F04B 9/113; F03G 3/00; F03G 3/094; F05B 2260/42
See application file for complete search history.

(56) References Cited

U.S. PATENT DOCUMENTS

| 1,784,424 A | * | 12/1930 | Garwood | .............. F16H 19/043 74/132 |
| 4,034,565 A | * | 7/1977 | McVeigh | .............. F03B 17/025 60/507 |

(Continued)

FOREIGN PATENT DOCUMENTS

| CN | 203822537 U | * | 9/2014 |
| DE | 10 2006 059 233 A1 | | 3/2008 |

(Continued)

*Primary Examiner* — Wesley G Harris
(74) *Attorney, Agent, or Firm* — Norman B. Thot

(57) ABSTRACT

A hydromechanical energy storage and energy conversion device includes a water reservoir, a float which is arranged in the water reservoir, a generator, an energy transmission apparatus, and a fixing device. The float can be lifted with a rising water level in the water reservoir from a lower position into an upper position. The first float can be fixed in the upper position. The generator converts a kinetic energy into an electrical energy. The energy transmission apparatus connects the float to the generator and transmits the kinetic energy between the float and the generator. The fixing device secures the float in the upper position.

9 Claims, 6 Drawing Sheets

(56) References Cited

U.S. PATENT DOCUMENTS

| | | | | |
|---|---|---|---|---|
| 4,207,741 A | * | 6/1980 | Rainey | F04B 9/113 |
| | | | | 60/497 |
| 4,720,976 A | * | 1/1988 | Kim | F03G 3/00 |
| | | | | 417/337 |
| 2008/0264056 A1 | | 10/2008 | Tung | |
| 2010/0043425 A1 | * | 2/2010 | Dragic | F03B 13/189 |
| | | | | 60/504 |
| 2011/0204645 A1 | | 8/2011 | Jacobson | |
| 2012/0280515 A1 | * | 11/2012 | Huang | F03B 13/06 |
| | | | | 290/52 |
| 2013/0134714 A1 | * | 5/2013 | Daqian | F03B 13/262 |
| | | | | 290/53 |
| 2013/0154270 A1 | | 6/2013 | Shinohara | |
| 2020/0024108 A1 | | 1/2020 | Pedretti et al. | |

FOREIGN PATENT DOCUMENTS

| | | | | |
|---|---|---|---|---|
| DE | 102019008393 A1 | * | 6/2021 | |
| GB | 2505415 A | * | 3/2014 | F03B 13/06 |
| JP | 50-031317 A | | 3/1975 | |
| JP | 2013-137013 A | | 7/2013 | |
| JP | 2014-514911 A | | 6/2014 | |
| WO | WO 2011/072280 A2 | | 6/2011 | |
| WO | WO-2011144189 A1 | * | 11/2011 | F03B 13/08 |
| WO | WO 2020/018329 A2 | | 1/2020 | |

* cited by examiner

HYDROMECHANICAL ENERGY STORAGE AND ENERGY CONVERSION DEVICE, AND OPERATING METHOD

CROSS REFERENCE TO PRIOR APPLICATIONS

This application is a U.S. National Phase application under 35 U.S.C. § 371 of International Application No. PCT/EP2021/086727, filed on Dec. 20, 2021 and which claims benefit to German Patent Application No. 10 2021 100 873.5, filed on Jan. 18, 2021. The International Application was published in German on Jul. 21, 2022 as WO 2022/152513 A1 under PCT Article 21(2).

FIELD

The present invention relates to a hydromechanical energy storage and energy conversion device.

BACKGROUND

In the light of the growing use of renewable energies, options for energy storage are assuming increasing significance.

An energy storage system is described, for example, in WO 2020/018 329 A2 which comprises a crane and a plurality of blocks, wherein the crane can move blocks from a lower level to a higher level by the stacking thereof. Electrical energy is thus saved in the form of the potential energy of blocks. By the movement of blocks from a higher level to a lower level, electrical energy can be generated from the kinetic energy of the blocks as they descend. The energy storage system can store electricity which is generated, for example, from solar energy during the daytime, in the form of potential energy in the stacked blocks and, during the night time, can convert the potential energy of the stacked blocks into electricity, which is then injected into the grid system.

Pumped-storage power plants are also known where, for the storage of energy, water is pumped uphill into storage tanks via electrical energy so that the potential energy of water is increased. Stored water is employed for the generation of electrical energy wherein, by the equalization of a height difference thereof, a turbine is driven, which is connected to a generator.

The effectiveness of this process is limited, however, on the grounds that, for example, for the operation of a 200 MW turbine, a water throughput of 11,000 liters per second is required. Pumped-storage power plants can moreover only be operated in locations where the geographical profile provides for a sufficient height difference, together with space for storage tanks in which corresponding quantities of water are available. Pumped-storage power plants also involve a substantial encroachment both upon the ecosystem and upon the landscape of the selected location.

In addition to energy storage, notwithstanding technologies which have been established in the interim, including wind energy generation and solar energy generation, there is a continuing demand for environmentally friendly and sustainable power generation technologies which in particular permit the most reliable and consistent recovery of energy possible. A further known technology comprises tidal power plants where potential and kinetic energy associated with tidal movements of the sea is converted into electrical energy, wherein turbines are driven by the ebb and flow of sea currents. During the changeover interval between ebb and flow, however, no current, or only a very limited current, prevails, so that generation of electrical energy is associated with very large fluctuations. Corrosion of metal components associated with saltwater is also problematic.

Post-published DE 10 2019 008 393 A1 describes an energy storage system where a float in a water-filled container is movable between a lower position and an upper position, wherein the water level in the water-filled container remains unchanged. The upper position is assumed by a corresponding flotation of the float, whereas the lower position is achieved by towing the float downwards via tow lines. Energy can be stored via the attachment of the float in the lower position. Electrical energy is absolutely essential in the first place, however, in order to apply tension to the tow lines and to permit the movement of the float into the lower position.

An energy storage apparatus is described in U.S. Pat. No. 4,207,741 in which a piston is moved back and forth in a water tank, and pressure is thus applied to a hydraulic fluid.

WO 2011/072 280 A2 describes an energy generation apparatus having a tank for the accommodation of a fluid, and an inlet and outlet for the filling or drainage of the tank. A container is also provided which moves vertically in the tank between a lower and an upper position. An energy transmission apparatus is coupled to the container in order to permit the transmission of energy generated by the motion of the container. The container can also be filled with a fluid.

SUMMARY

An aspect of the present invention is to provide an energy storage device, and an associated operating method therefor, which permit an effective, environment-friendly and reliable storage of energy. An aspect of the present invention is also to provide an energy conversion apparatus, and a corresponding operating method therefor, via which electrical energy can be generated in an environment-friendly, sustainable, reliable, and consistent manner.

In an embodiment, the present invention provides a hydromechanical energy storage and energy conversion device which includes a water reservoir, a first float which is arranged in the water reservoir, a first generator, a first energy transmission apparatus, and a fixing device. The first float is configured to be lifted with a rising water level in the water reservoir from a lower position into an upper position. The first float is configured to be fixed in the upper position. The first generator is configured to convert a kinetic energy into an electrical energy. The first energy transmission apparatus is configured to connect the first float to the first generator and to transmit the kinetic energy between the first float and the first generator. The fixing device is configured to secure the first float in the upper position.

BRIEF DESCRIPTION OF THE DRAWINGS

The present invention is described in greater detail below on the basis of embodiments and of the drawings in which.

DETAILED DESCRIPTION

Figure 1:
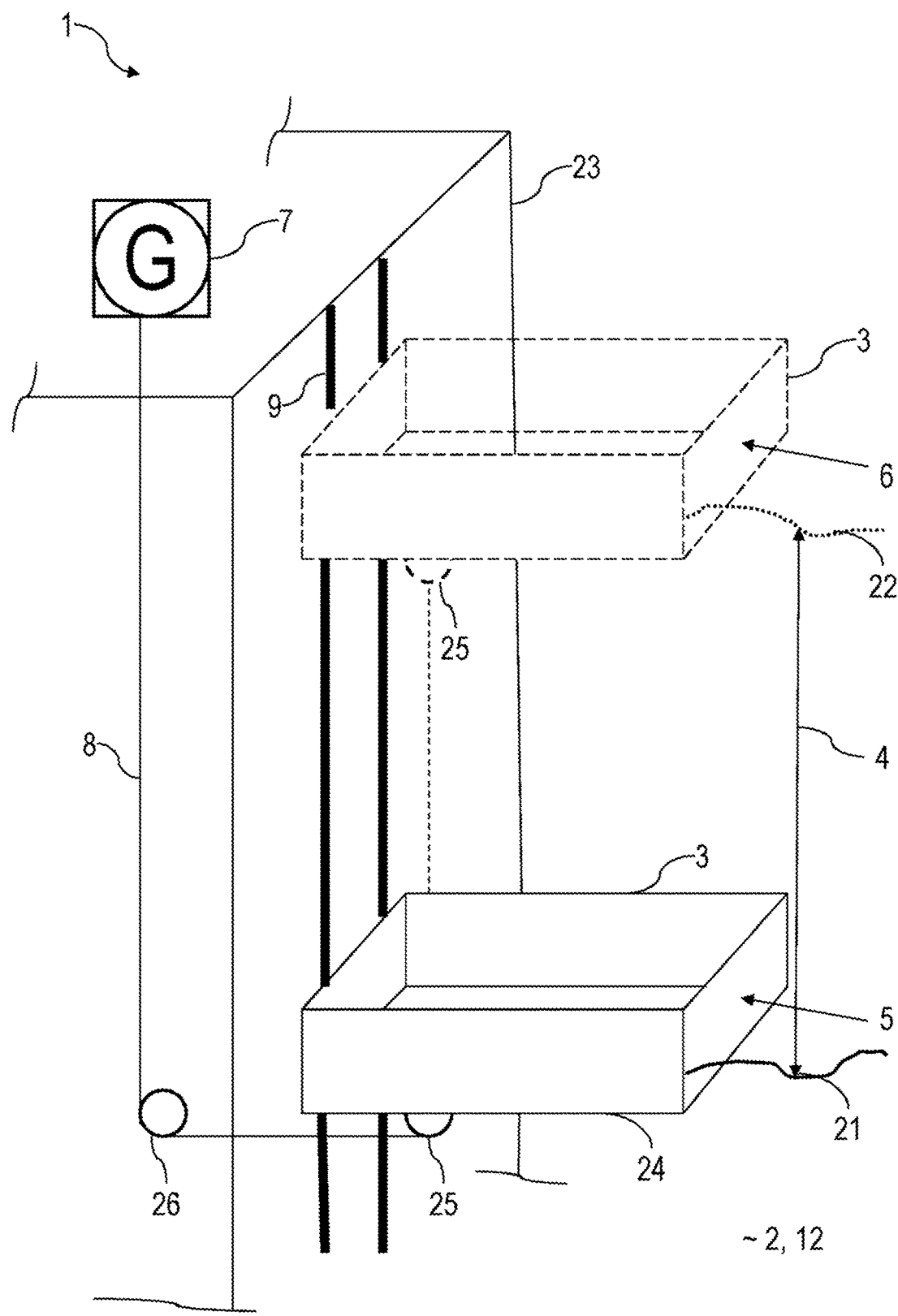
FIG. 1 shows a first exemplary embodiment of a hydromechanical energy storage and energy conversion device, in a perspective representation.

A hydromechanical energy storage and energy conversion device according to the present invention, described hereinafter as the "device", comprises the following: a water reservoir, a first float which is arranged in the water reservoir and which can be lifted with the rising water level in the water reservoir from a lower position into an upper position and which can be fixed in the upper position, a first generator for converting kinetic energy into electrical energy, and a first energy transmission apparatus which connects the first float to the first generator, and which is designed to transmit kinetic energy between the first float and the first generator.

The water reservoir can be formed by a natural body of water, e.g., a sea or lake. The water reservoir can alternatively be an artificially configured container. An option is thus provided for the employment of existing water reservoirs, e.g., swimming pools, settlement tanks, etc., so that a further application can be assigned thereto, and the device can be installed in a manner which conserves resources.

The device can be operated in either salt water or fresh water, wherein operation in fresh water is advantageous with respect to reduced corrosion.

The float is buoyant, and can be configured, for example, in the form of a concrete tank, an (old) ship, a container, etc. Existing objects can, for example, be employed as floats so that a further application can be assigned thereto, and the device can be installed in a manner which conserves resources.

The generator can assume various structural forms provided that it is capable of converting kinetic energy into electrical energy within the selected energy range.

The energy transmission apparatus is employed for the transmission of kinetic energy from the first float to the generator. It can comprise, for example, toothed racks, cable pulls, chains, gear wheels, guide pulleys, transmissions, etc.

Energy can be saved via the device in the form of potential energy as the water level in the water reservoir rises. This can occur naturally, for example, by flooding, waves, etc., or can be achieved by introducing additional water into the water reservoir, e.g., using pumps.

Via the rise in the water level, the first float is raised from a lower position into an upper position. The potential energy of the first float is accordingly increased. In other words, the change in water level is employed as a driving force for raising the first float from the lower position into the upper position. The first float is at all times at least partially located above the water level, i.e., the first float floats at the water surface.

The potential energy of the first float can be stored by fixing the first float in the upper position. Fixing is provided via a fixing device which defines the upper position of the float independently of the water level.

Fixing can optionally be permitted in a plurality of positions above the upper position. The action of the fixing device for the fixing of the first float is such that the first float remains in the upper position even if the water level in the water reservoir falls.

The fixing device can be configured, for example, in the form of a fixing bolt. It can be fastened to a wall of the water reservoir so that, where fixing is required, a fixed, but nevertheless detachable connection, can be formed between the first float and the wall of the water reservoir. The fixing device can alternatively also cooperate with the first energy transmission apparatus and secure the first float in an indirect manner, wherein the movement of the first fixing element, which is rigidly bonded to the first float, thus prevents any transmission of kinetic energy between the first float and the first generator.

The fixing device provides a simple and reliable option for securing the first float in the upper position, thereby storing the potential energy which is associated with the upper position. As a result, notwithstanding any fall in the water level, the first float can be maintained in the upper position so that potential energy which is stored in the first float can be converted into kinetic energy only when required and independently of any fall in the water level.

In order to discharge stored energy, i.e., for the conversion of stored potential energy into electrical energy, the first float is lowered from the upper position, for example, back to the lower position. Potential energy is accordingly firstly converted into kinetic energy, and kinetic energy is then converted into electrical energy via the first generator. Transmission of kinetic energy from the first float to the first generator is executed via the first energy transmission apparatus.

Electrical energy which is generated can be employed directly for the operation of electrical installations. In other words, the device can permit the storage and generation of electrical energy directly at the location of the device, and thus independently of any electric power grids available.

Alternatively or additionally, electrical energy generated can be injected into an electric power grid. Injection into an electric power grid advantageously permits the geographical separation between the site of storage and generation, and the site of consumption.

In addition to the conversion of potential energy into kinetic energy, and thereafter into electrical energy, by the lowering the first float from the upper position, a proportion of the kinetic energy of the first float associated with the raising thereof from the lower to the upper position can also be converted into electrical energy by the first generator. In other words, electrical energy can be retrieved both during the raising and during the lowering of the float.

The device advantageously permits an effective, environmentally-friendly and reliable storage of energy which excludes any absolute dependence upon natural processes such as wind, sunshine, etc., together with energy conversion.

According to further variants of embodiment, the water reservoir can be a natural body of water, for example, a sea or lake.

The employment of a natural body of water simplifies the construction of the device. Natural processes such as, for example, ebb and flow or waves, can also be employed for the variation of the water level. The storage conversion of energy contained in natural bodies of water is additionally permitted so that electrical energy can be generated in a sustainable and environment-friendly manner.

The water reservoir can alternatively be configured in the form of a first container having a closable opening for the admission or discharge of water to or from the first container. The opening can, for example, be arranged at a lower end of the first container so that, for example, a complete evacuation of the first container is permitted.

The first container can, for example, be an artificially configured container, for example, an existing first container. This permits the construction of the device independently of the presence of a natural water reservoir so that the device can be constructed and operated at arbitrary locations.

The opening of the first container is configured in a closable arrangement, e.g., via dampers, so that any lowering of the water level in the first container can be prevented by the closure of the opening. The opening is opened so that water can be admitted to the first container in order to raise the water level in the first container.

The opening can optionally be connected to a natural body of water in a water-conducting manner, e.g., via pipes. This permits the exchange of water between the first container and the natural water reservoir.

The first container can, for example, be arranged in a lake or a sea. This permits ebb and flow and/or waves to be employed for the admission and/or discharge of water to/from the first container, thus permitting a variation of the water level in the first container which can be employed for energy storage and energy conversion in accordance with the above-mentioned description.

The device can optionally comprise a water storage container, wherein the opening in the first container is connected to the water storage container in a water-conducting manner, e.g., via pipes.

The water storage container can, for example, be an artificially configured container, for example, an existing container such as e.g., a swimming pool, a settlement tank, etc., so that a further application can be assigned thereto, and the device can be installed in a manner which conserves resources. The water storage container can further, for example, be arranged below the water reservoir so that water can flow from the water reservoir to the water storage container, either partially or entirely, only by the action of gravity.

If the opening in the first container is connected to a natural body of water and/or to the water storage container in a water-conducting manner, the device can comprise a pump apparatus for the infeed of water from the natural body of water and/or from the water storage container to the water reservoir.

The pump apparatus provides a simple, effective, and reliable option for the variation of the water level in the first container.

According to further variants of the embodiments, the device can comprise, in addition to the first container, a second container having a closable opening for admission and discharge of water to or from the second container, a second float, which is arranged in the second container and which can be lifted with the rising water level in the second container from a lower position into an upper position and which can be fixed in the upper position, a second generator for converting kinetic energy into electrical energy, and a second energy transmission apparatus which connects the second float to the second generator, and which is designed to transmit kinetic energy between the second float and the second generator. The second container is connected to the first container and/or to either the water storage container or to the natural body of water in a water-conducting manner, e.g., via pipes.

The first container having the first float and the second container having the second float can have identical designs so as to reduce the complexity and costs associated with constructing the device.

For a more detailed description of the second container, the second generator, and the second energy transmission apparatus, reference may be made to the above-mentioned description of the first container, the first generator, and the first energy transmission apparatus, which is transferable in a corresponding manner.

The second container can be arranged, for example, below the first container. The term "below" describes a vertical position in relation to the earth's gravitational field, i.e., a position closer to the center of the earth. The height difference between the first container and the second container can, for example, be between 1 and 2 meters, measured between the lowest points within the containers.

Further containers, floats, generators and energy transmission and energy transmission apparatuses can optionally be provided, which are respectively arranged below one another and/or are connected either to the water storage container to the natural body of water in a water-conducting manner. Energy storage capacity can thus be increased, and a particularly consistent generation of electrical energy provided.

According to further variants of the embodiments, the first and/or second floats can be configured in the form of water-fillable hollow bodies.

The structural design of hollow bodies can be open or closed at its upper end. By filling the float during the positioning thereof in the upper position, the mass of the float, and thus the potential energy stored, can be increased so that, upon the lowering thereof to the lower position, more kinetic energy can be converted into electrical energy.

To this end, the device can comprise a water container which is arranged above the first and/or second container, wherein the water container is connected to the first and/or second float in a water-conducting manner, e.g., via pipes, in particular during the positioning of the float in the respective upper position.

The term "above" again describes a vertical position in relation to the earth's gravitational field, i.e., a position which is further removed from the center of the earth. The water container can, for example, be an artificially configured container, for example, an existing container such as e.g., a swimming pool, a settlement tank, etc., so that a further application can be assigned thereto, and the device can be installed in a manner which conserves resources.

The water container can be configured, for example, so that it is fillable via a further pump apparatus. Although energy is required for this purpose, filling of the water container can be performed during periods of surplus energy on the power grid system so that electrical energy which would otherwise be surplus to requirements can at least partially be stored in the form of the potential energy of water pumped into the water container.

A natural influx of water to the water container, e.g., from a river or stream, is Alternatively or additionally possible.

According to further variants of the embodiments, the first energy transmission apparatus can be configured for the direct transmission of kinetic energy between the first float, and the first generator and/or the second energy transmission apparatus can be configured for the direct transmission of kinetic energy between the second float and the second generator.

In other words, the first energy transmission apparatus can connect the first float directly to the first generator and/or the second energy transmission apparatus can connect the second float directly to the second generator. Transmission of kinetic energy from the first float to the first generator and/or from the second float to the second generator can thus be executed directly, i.e., with no intervening conversion into other forms of energy such as, for example, pressure energy, i.e., the potential energy of a pressurized container. Energy losses can thus be reduced, and further energy conversion apparatuses for converting pressure energy into kinetic energy are dispensable. No pressure-resistant lines and containers are moreover required.

A further aspect of the present invention relates to an operating method for an energy storage and energy conversion device according to the above-mentioned description. The method comprises the following: movement of the first float from the lower position into the upper position and from the upper position into the lower position, in response to variations of the water level in the water reservoir, transmission of kinetic energy from the first float to the first generator during the movement of the first float from the lower position into the upper position and from the upper position into the lower position, and conversion of kinetic energy transmitted into electrical energy.

Advantages of the energy storage and energy conversion device are correspondingly associated with the operating method. The description of the energy storage and energy conversion device can simultaneously be employed for the explanation of the operating method.

The method can optionally comprise a fixing of the first float in the upper position. Further features of the method proceed from the functional description of the energy storage and energy conversion device.

The present invention is described in an exemplary manner hereinafter with respect to embodiments and with reference to the attached drawings, wherein each of the features described hereinafter can represent an aspect of the present invention, either in itself or in various mutual combinations.

In the examples described hereinafter, reference is made to the attached drawings, which form an element of the examples and in which, for illustrative purposes, specific embodiments in which the present invention can be implemented are represented. In this context, directional terms such as, for example, "above", "below", "in front", "behind", "front", "rear", etc. are employed with reference to the orientation represented in the drawing(s) described. As components of embodiments can be positioned in a number of different orientations, directional terms are provided by way of illustration, and are in no sense restrictive. An exception applies to the directional terms "above" and "below", which refer to a vertical position in the earth's gravitational field, and thus approximate to the distance from the center of the earth. In this respect, an arrangement "above", of equal mass, is associated with greater potential energy than an arrangement "below".

It is understood that other embodiments can be employed, and structural or logical variations executed, without departing from the protective scope of the present invention. It is understood that features of the various exemplary embodiments described herein can be mutually combined, unless specifically indicated otherwise. The following description is therefore not to be understood in any restrictive sense.

In the context of this description, the term "connected" is employed to describe both a direct and an indirect connection. In the drawings, identical or similar elements are identified by the same reference symbols, insofar as appropriate.

FIG. 1 shows a representative sketch of a first exemplary embodiment of an energy storage and energy conversion device 1. The device 1 employs a water reservoir 2, in the form of a natural body of water 12, for example, a sea with a large tidal range. Water is contained in the water reservoir 2. The water level 4 in the water reservoir fluctuates between a lower water level 21 and an upper water level 22 in response to the tidal range, i.e., the lower water level 21 corresponds to the water level 4 during an ebb tide, and the upper water level 22 corresponds to the water level 4 during a flood tide. The water level 4 can alternatively or additionally also vary in response to water waves.

The water reservoir 2 is delimited on at least one side by a wall 23. The wall 23 can, for example, be configured in the form of a harbor wall.

A first float 3 is arranged in the water reservoir 2 which, in the exemplary embodiment, is a hollow concrete body. The first float 3 is configured as buoyant so that its bottom-most delimiting surface 24, in the floating state, approximately corresponds to the height of the lower water level 21. In FIG. 1, the first float 3, in the lower position 5, is represented by solid lines. As the water level rises 4, the first float is raised from the lower position 5 to the upper position 6. The first float 3 is represented by broken lines in the upper position 6 in FIG. 1.

A fixing device 9 is arranged on the wall 23 which, in the exemplary embodiment, is configured in the form of a rail system along which the first float 3 can move between the lower position 5 and the upper position 6. Via (unrepresented) fixing elements, which can be configured e.g., in the form of brake shoes, or in the form of hook-shaped latching devices which are fastened to the float 3 and which cooperate with corresponding latching lugs of the fixing device 9, the first float 3 can be secured in the upper position 6 to prevent any sinking of the first float 3 as the water level 4 falls.

The device 1 further comprises a first generator 7 for converting kinetic energy into electrical energy which, via the first energy transmission apparatus 8, is connected to the first float 3. In the exemplary embodiment, the first energy transmission apparatus 8 is configured in the form of a cable pull which is routed via a rope pulley 25 and a guide pulley 26.

For energy storage, the first float 3, as the water level 4 in the water reservoir 2 rises, is moved from the lower position 5 into the upper position 6, wherein kinetic energy is converted into potential energy. Energy can be stored in the form of the potential energy of the first float in the upper position 6 by fixing of the first float 3 in the upper position 6 via the fixing device 9.

The first float 3 is lowered back into the lower position 5 for the discharging stored potential energy. The potential energy component of the first float 3 in the upper position 6 which is converted into kinetic energy is thus transmitted by the energy transmission apparatus 8 to the generator 7 which converts this kinetic energy into electrical energy and injects the electrical energy, for example, into an (unrepresented) electric power grid.

During the raising of the first float 3 from the lower position 5 into the upper position 8, kinetic energy can correspondingly also be transmitted by the energy transmission apparatus 8 to the generator 7 and converted by the generator 7 into electrical energy.

Via the fluctuation of the water level 4 between the lower water level 21 and the upper water level 22, associated energy can therefore be converted into electrical energy. If the water level 4 fluctuates by a natural process, electrical energy can be retrieved in an environment-friendly and sustainable manner. By the fixing of the first float 3 in the upper position 6, an option is provided for energy storage so that electrical energy can be generated in a needs-based manner.

By the assembly of a plurality of floats, fixing devices, generators, etc., and a corresponding control of energy storage and energy conversion processes, electrical energy can be delivered in a consistent and reliable manner.

Figure 2:
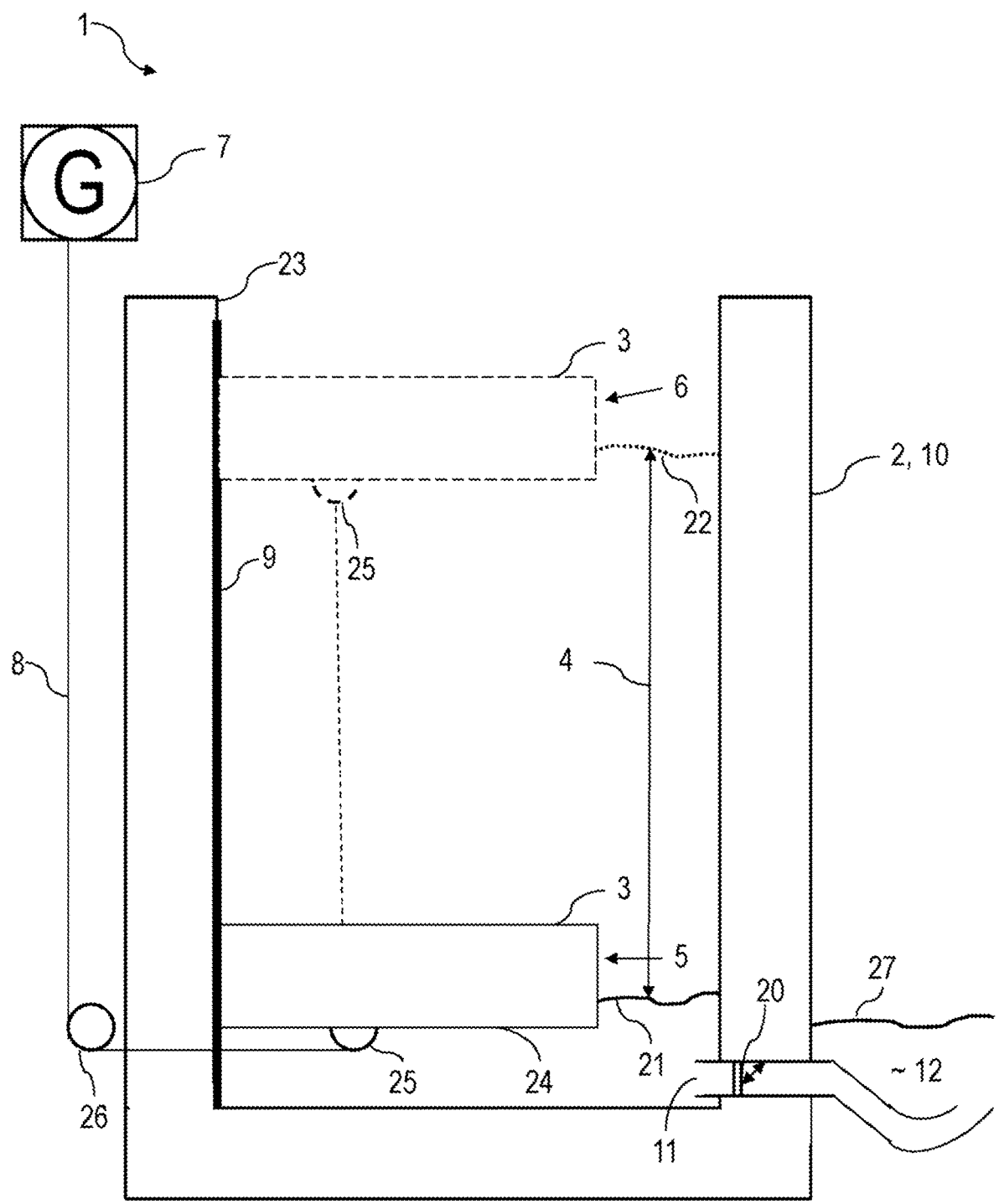
FIG. 2 shows a second exemplary embodiment of a hydromechanical energy storage and energy conversion device, in a sectional representation.

FIG. 2 shows a second exemplary embodiment of a hydromechanical energy storage and energy conversion device 1. By way of distinction from the hydromechanical energy storage and energy conversion device 1 according to the first exemplary embodiment (see FIG. 1), the water reservoir 2 is here configured, not in the form of a natural body of water 12, but in the form of a first container 10. The first container 10 is an artificially configured container 10 and comprises an opening 11 for the admission and discharge of water to/from the first container 10 via which the water level 4 in the first container can be varied. It is also possible for a plurality of openings 11 to be provided via which control of the water level 4 can be simplified. The opening 11 is closable via a closure device 20 which can be configured, for example, in the form of the shutter shown in FIG. 2.

The opening 11 is connected, in a water-conducting manner, to a natural body of water 12, e.g., a sea or lake. In the event of a variation in the water level 27 of the natural body of water 12, e.g., associated with ebb and flow and/or waves, water can be correspondingly admitted to, or removed from, the first container. With respect to the operating principle, reference may be made to the descriptions of FIG. 1.

The fixing device 9 can optionally be omitted in this exemplary embodiment, as a fixing of the first float 3 in the upper position 6 is also possible via the upper water level 4, wherein the upper water level 22 can be maintained constant by the closure of the opening 11.

Figure 3:
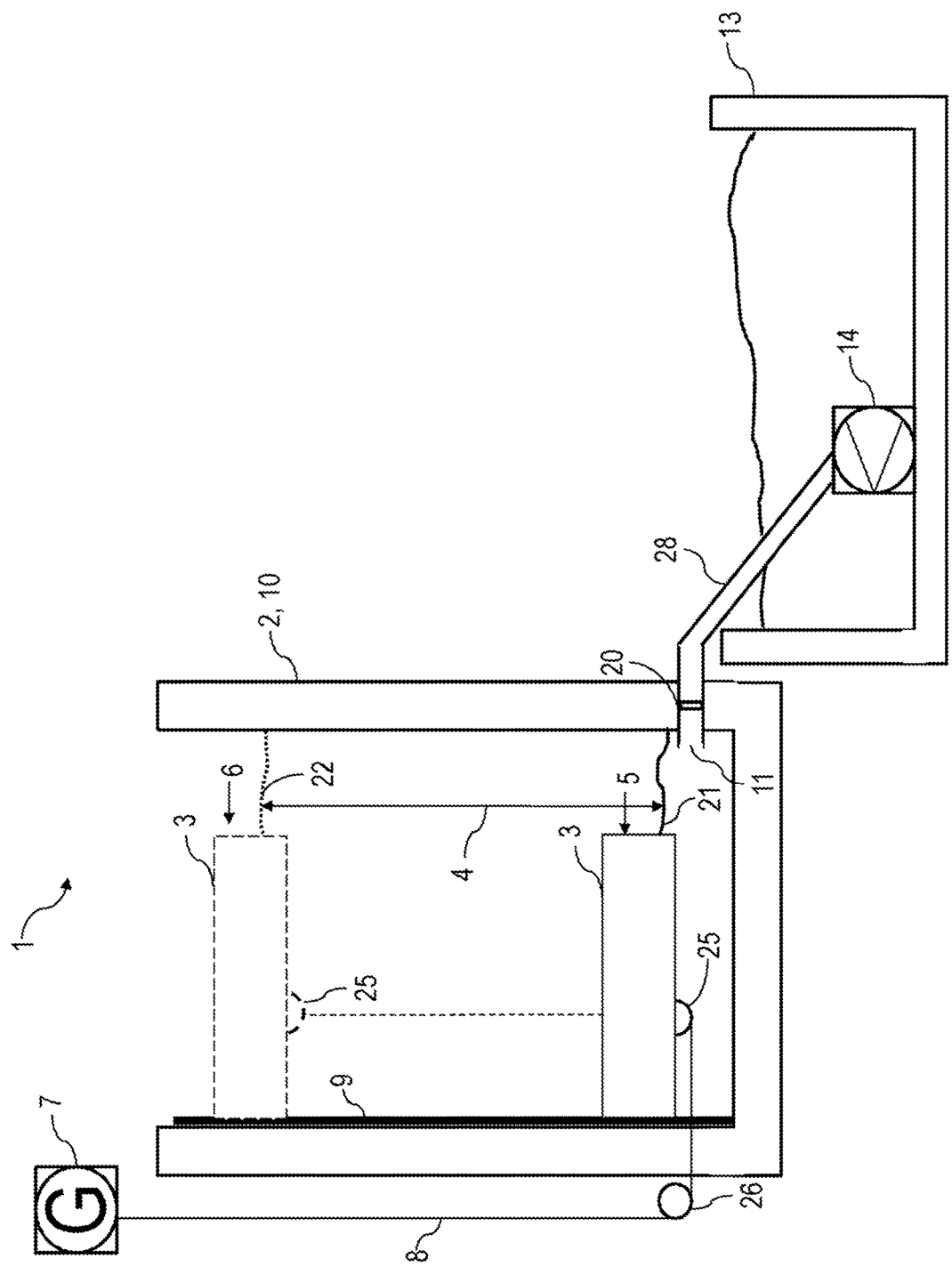
FIG. 3 shows a third exemplary embodiment of a hydromechanical energy storage and energy conversion device, in a sectional representation.

FIG. 3 shows a third exemplary embodiment of a hydromechanical energy storage and energy conversion device 1. By way of distinction from the hydromechanical energy storage and energy conversion device 1 according to the second exemplary embodiment (see FIG. 2), the opening 11 of the water reservoir 2 is not connected, in a water-conducting manner, to a natural body of water 12, but to a water storage container 13. Pipe 28 is employed for this purpose. In other aspects, the descriptions according to FIG. 2 apply.

The water storage container 13 is an artificially configured container. The device 1 can thus be constructed and operated independently of natural bodies of water 12. Existing structures, e.g., water containers, generators, etc., for example, in decommissioned power plants, can in particular be employed so that little or no environmental damage is associated with the construction of the device 1. The device can, for example, essentially be constructed at ground level so that a cost-effective construction is also possible.

A pump apparatus 14 is arranged in the water storage container 13 via which water can be pumped from the water storage container 13 into the first container 10. The pump apparatus 14 is operable by electric power. For example, surplus energy which is present in the electric power grid can be employed to pump water from the water storage container 13 into the first container 10. In other words, the device 1 can be employed as a buffer store for surplus electrical energy in the electric power grid which is generated, for example, by solar energy installations or wind turbines under conditions of high solar irradiation or prevailing wind.

Figure 4:
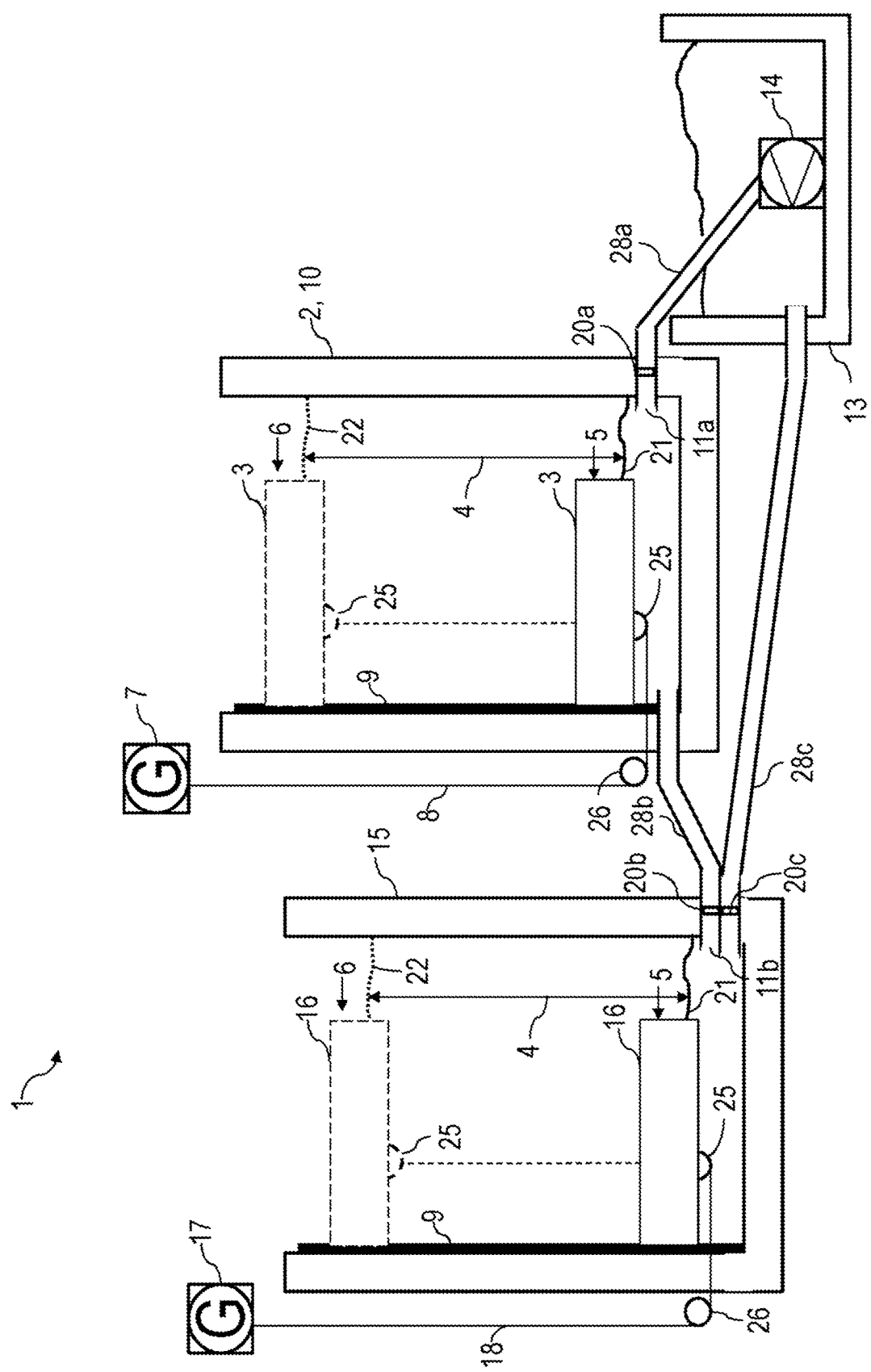
FIG. 4 shows a fourth exemplary embodiment of a hydromechanical energy storage and energy conversion device, in a sectional representation.

FIG. 4 shows a fourth exemplary embodiment of a hydromechanical energy storage and energy conversion device 1. By way of distinction from the hydromechanical energy storage and energy conversion device 1 according to the third exemplary embodiment (see FIG. 3), additionally, a second container 15 having a closable opening 11b for the admission and discharge of water to/from the second container 15 is provided. The second container 15 is configured with an identical design to the first container 10, and thus has a second float 16 which is arranged in the second container 15, which can be lifted with the rising water level in the second container 15 from a lower position 5 into an upper position 6, and can be fixed in the upper position 6, a second generator 17 for converting kinetic energy into electrical energy, and a second energy transmission apparatus 18 which connects the second float 16 to the second generator 17, and is configured to transmit kinetic energy between the second float 16 and the second generator 17.

The second container 15 is connected to the first container 10, in a water-conducting manner, via the pipe 28b, which can be closed by a closure device 20b. The closure device 20b, as per the closure devices 20, 20a, can be configured in the form of a shutter. The second container 15 is moreover connected to the water storage container 13, in a water-conducting manner, by a further pipe 28c which is closable via the closure device 20c.

In the fourth exemplary embodiment, the second container 15 is arranged below the first container 10 so that the second container 15 is automatically filled with water from the first container 10 if the opening 11b is open. This configuration permits a particularly consistent generation of electric power in that the two floats 3, 16 are moved with a temporal offset and the first generator 7 and the second generator 17 can consequently be employed with a temporal offset for the generation of electric power. Stoppages in the generation of electric power can avoided be accordingly.

Figure 5:
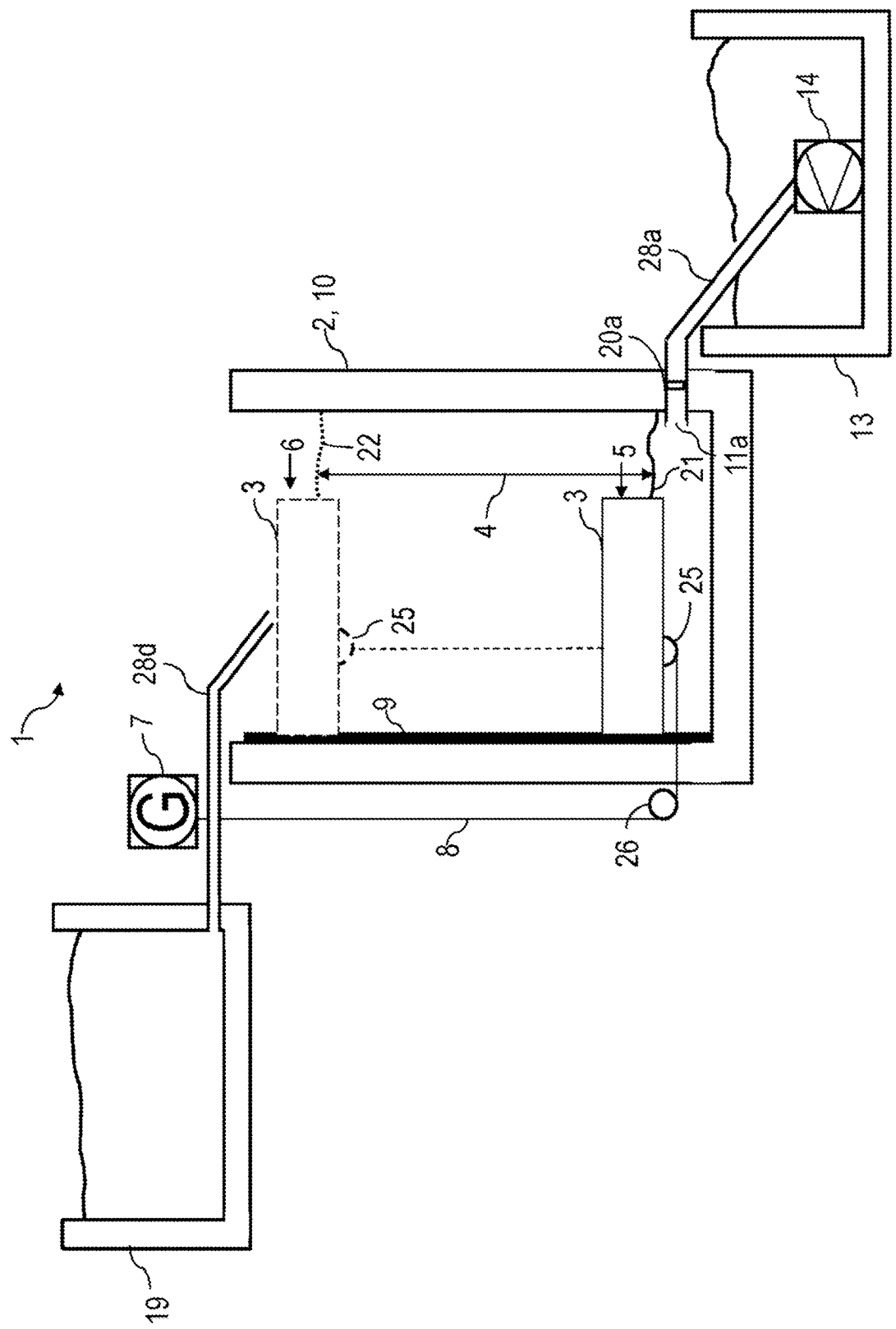
FIG. 5 shows a fifth exemplary embodiment of a hydromechanical energy storage and energy conversion device, in a sectional representation.

FIG. 5 shows a fifth exemplary embodiment of a hydromechanical energy storage and energy conversion device 1. By way of distinction from the hydromechanical energy storage and energy conversion device 1 according to the third exemplary embodiment (see FIG. 3), additionally, a water container 19 is arranged above the first container, which is connectable to the first float 3, in a water-conducting manner by pipe 28d. The first float 3 which, according to the preceding description, is accordingly configured in the form of a hollow concrete body, can be filled with water from the water container 19 if the first container 3 is located in the upper position 6.

Filling with water increases the mass of the first float 3, and thus its potential energy. Upon the lowering of the first float from the upper position 6 into the lower position 5, more kinetic energy can consequently be transmitted to the first generator 7. If the first float 3 is restored to the lower position 5, water can be released from the first float 3 into the first container 10. Openings (which are not shown in the drawings) in the first float 3 can be employed therefor.

The water container 19 can be filled from a further (not shown) water container by a pump apparatus, for which purpose, surplus electrical energy in the electric power grid can, for example, be employed. The water container 19 can alternative or additionally also be filled from a natural source of water, e.g., a stream.

A further water container can in a corresponding manner also be assigned to the second float, or both the first float 3 and the second float 16 can be filled from the same water container 19.

A water container 19 can naturally also be employed, in an analogous manner, in combination with a first container 10, the opening 11 of which is connected, in a water-conducting manner, to a natural body of water 12, wherein the first container 10 is configured e.g., in the form of a hulk of a ship which floats in the sea.

Figure 6:
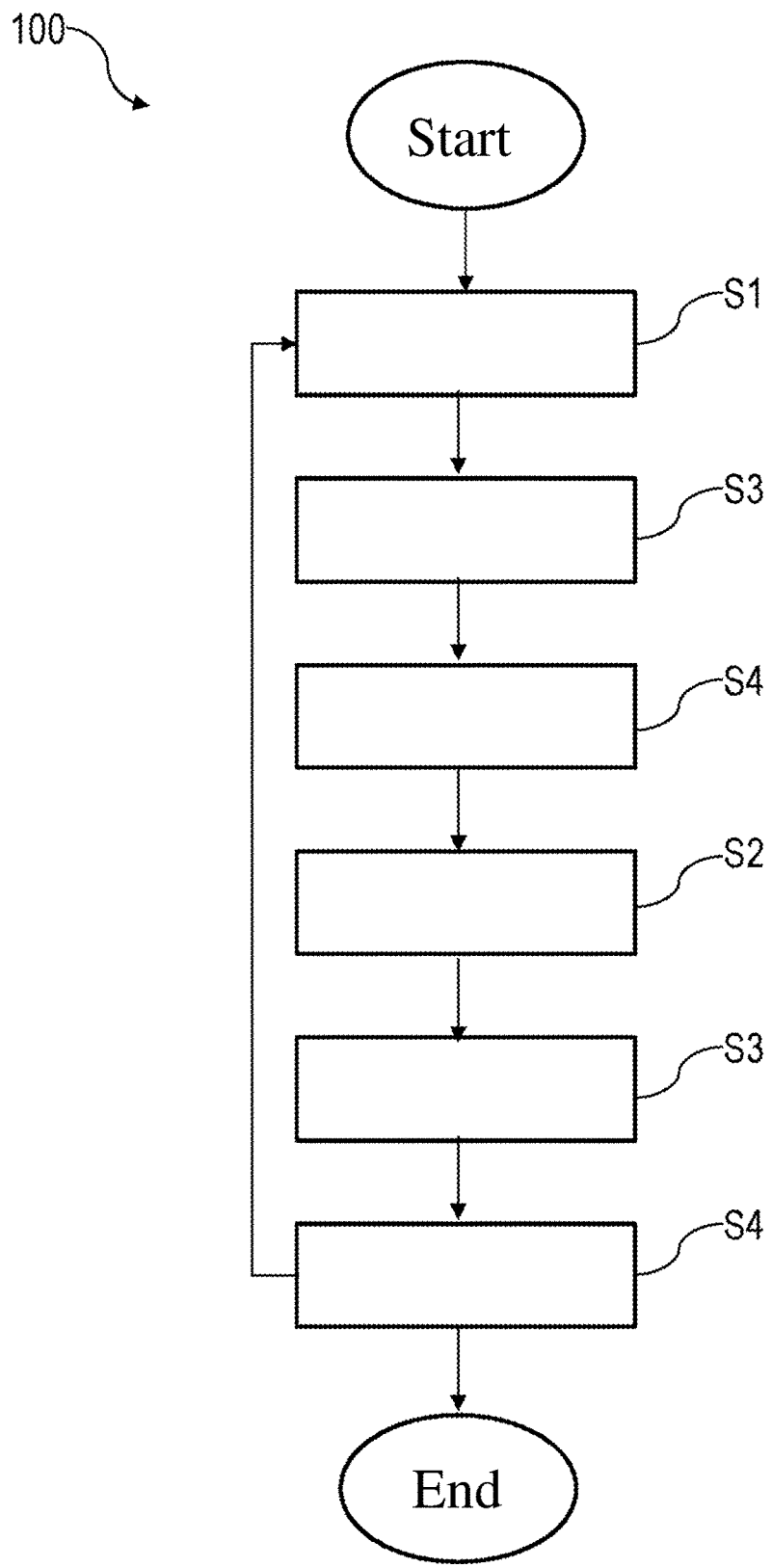
FIG. 6 shows a flow diagram of an exemplary operating method.

FIG. 6 shows an exemplary operating method 100 for an energy storage and energy conversion device 1, for example, an energy storage and energy conversion device 1 described above with reference to FIGS. 1 to 5.

Further to the start of the method 100, the first float 3, in process step S1, is moved from the lower position 5 into the upper position 6, wherein the water level 4 in the water reservoir 2 is correspondingly varied, i.e., increased. In process step S3, kinetic energy is thus transmitted directly from the first float 3 to the first generator 7 by the energy transmission apparatus 8. Kinetic energy transmitted is converted into electrical energy in process step S4.

Thereafter, in process step S2, the first float 3 is moved back from the upper position 6 into the lower position 5, wherein the water level 4 in the water reservoir 2 is correspondingly varied, i.e., reduced. In process step S3, kinetic energy is thus transmitted directly from the first float 3 to the first generator 7 by the energy transmission apparatus 8. Kinetic energy transmitted is converted into electrical energy in process step S4.

After process step S4, the method 100 can continue back to process step S1, or can be terminated.

The present invention is not limited to embodiments described herein; reference should be had to the appended claims.

LIST OF REFERENCE SYMBOLS

1 Hydromechanical energy storage and energy conversion device
2 Water reservoir
3 First float
4 Water level
5 Lower position
6 Upper position
7 First generator
8 First energy transmission apparatus
9 Fixing device
10 First container
11, 11a-b Opening
12 Natural body of water
13 Water storage container
14 Pump apparatus
15 Second container
16 Second float
17 Second generator
18 Second energy transmission apparatus
19 Water container
20, 20a-c Closure device
21 Lower water level
22 Upper water level
23 Wall
24 Bottommost delimiting surface
25 Rope pulley
26 Guide pulley
27 Water level of natural body of water
28, 28a-d Pipe
100 Operating method
S1 Movement of the first float from the lower position into the upper position, by means of a variation of the water level in the water reservoir
S2 Movement of the first float from the upper position into the lower position, by means of a variation of the water level in the water reservoir
S3 Transmission of kinetic energy from the first float to the first generator
S4 Conversion of kinetic energy transmitted into electrical energy.

What is claimed is:

1. A hydromechanical energy storage and energy conversion device comprising:
a water reservoir which is configured in a form of a first container which comprises a closable opening for an admission of water to the first container or a discharge of water from the first container;
a first float which is arranged in the water reservoir and which is configured to be lifted with a water level which is rising in the water reservoir from a lower position into an upper position and which is configured to be fixed in the upper position;
a first generator which is configured to convert a kinetic energy into an electrical energy;
a first energy transmission apparatus which is configured to connect the first float to the first generator and to transmit the kinetic energy between the first float and the first generator;
a fixing device which is configured to secure the first float in the upper position;
a second container comprising a closable opening for an admission of water to the second container or a discharge of water from the second container;
a second float which is arranged in the second container and which is configured to be lifted with a water level which is rising in the second container from a lower position into an upper position and which can be fixed in the upper position;
a second generator which is configured to convert a kinetic energy into an electrical energy;
a second energy transmission apparatus which is configured to connect the second float to the second generator and to transmit the kinetic energy between the second float and the second generator; and
a water storage container,
wherein,
the closable opening of the first container is connected to the water storage container in a water-conducting manner,
the second container is connected to the first container and to the water storage container in a water-conducting manner, and
the water storage container is arranged below the first container and below the second container.

2. The hydromechanical energy storage and energy conversion device as recited in claim 1, wherein the water reservoir is a natural body of water.

3. The hydromechanical energy storage and energy conversion device as recited in claim 1, wherein the closable opening of the first container is further connected to a natural body of water in a water-conducting manner.

4. The hydromechanical energy storage and energy conversion device as recited in claim 3, comprising:
a pump apparatus which is configured to feed water from at least one of the natural body of water and from the water storage container to the water reservoir.

5. The hydromechanical energy storage and energy conversion device as recited in claim 1, wherein the second container is arranged below the first container.

6. The hydromechanical energy storage and energy conversion device as recited in claim 1, wherein the at least one of the first float and the second float is/are configured in a form of a hollow body which is fillable with water.

7. The hydromechanical energy storage and energy conversion device as recited in claim 6, further comprising:

a water container which is arranged above at least one of the first container and the second container, wherein, the water container is connectable to at least one of the first float and to the second float in a water-conducting manner.

8. The hydromechanical energy storage and energy conversion device as recited in claim 1, wherein at least one of, the first energy transmission apparatus is further configured for a direct transmission of the kinetic energy between the first float and the first generator, and the second energy transmission apparatus is further configured for a direct transmission of the kinetic energy between the second float and the second generator.

9. A method of operating the hydromechanical energy storage and energy conversion device as recited in claim 1, the method comprising:

providing the hydromechanical energy storage and energy conversion device as recited in claim 1;

moving the first float from the lower position into the upper position, and from the upper position into the lower position, by varying the water level in the water reservoir;

transmitting the kinetic energy from the first float to the first generator during the moving of the first float from the lower position into the upper position, and from the upper position into the lower position; and converting the kinetic energy transmitted into the electrical energy.

* * * * *